United States Patent [19]

Broding

[11] Patent Number: 4,601,024
[45] Date of Patent: Jul. 15, 1986

[54] BOREHOLE TELEVIEWER SYSTEM USING MULTIPLE TRANSDUCER SUBSYSTEMS

[75] Inventor: Robert A. Broding, Tulsa, Okla.

[73] Assignee: Amoco Corporation, Chicago, Ill.

[21] Appl. No.: 242,497

[22] Filed: Mar. 10, 1981

[51] Int. Cl.[4] .............................................. G01V 1/40
[52] U.S. Cl. ........................................ 367/86; 367/88
[58] Field of Search ............... 181/104, 105, 102, 103, 181/106; 367/119, 28, 29, 25, 32, 34, 35, 69, 71, 78–80, 86, 101, 21; 340/858, 861; 73/151

[56] References Cited

U.S. PATENT DOCUMENTS

| | | | |
|---|---|---|---|
| 3,237,153 | 2/1966 | Blizard | 340/861 |
| 3,369,626 | 2/1968 | Zemanek, Jr. | 367/69 |
| 3,378,097 | 4/1968 | Straus et al. | 367/86 |
| 3,406,776 | 10/1968 | Henry | 367/75 |
| 3,426,865 | 2/1969 | Henry | 367/86 X |
| 3,550,075 | 12/1970 | Hilchie et al. | 367/28 |
| 3,631,385 | 12/1971 | Silverman | 367/35 X |
| 3,668,619 | 6/1972 | Dennis | 367/69 |
| 3,693,415 | 9/1972 | Wittington | 367/105 |
| 3,728,672 | 4/1973 | Dennis et al. | 367/71 |
| 3,732,945 | 5/1973 | Lavigne | 367/189 |
| 3,835,953 | 9/1974 | Summers | 367/27 |
| 3,949,352 | 4/1976 | Vogel | 367/31 |
| 3,959,767 | 5/1976 | Smither et al. | 340/858 |
| 4,209,853 | 6/1980 | Hyatt | 367/11 X |
| 4,283,953 | 2/1981 | Plora | 367/86 |

FOREIGN PATENT DOCUMENTS

| | | |
|---|---|---|
| 1172385 | 11/1969 | United Kingdom . |
| 1221471 | 2/1971 | United Kingdom . |
| 1390998 | 4/1975 | United Kingdom . |
| 1474741 | 5/1977 | United Kingdom . |
| 1495279 | 12/1977 | United Kingdom . |
| 2020023 | 11/1979 | United Kingdom . |
| 2043898 | 10/1980 | United Kingdom . |

Primary Examiner—Thomas H. Tarcza
Assistant Examiner—Ian J. Lobo

[57] ABSTRACT

In an acoustic logging system for providing information regarding selected parameters of the wall of a borehole in the earth, and of the rock formation which is adjacent the borehole, in which a single transmit/receive transducer system (T/RTS) mounted on a rotating assembly probes the wall of the borehole in a circular scanning pattern as a function of depth, the improvement which includes at least a second T/RTS mounted on the rotating assembly in known geometrical relation to the first T/RTS, and means to utilize in combination the electrical scan signals from the at least two scanning T/RTS.

6 Claims, 21 Drawing Figures

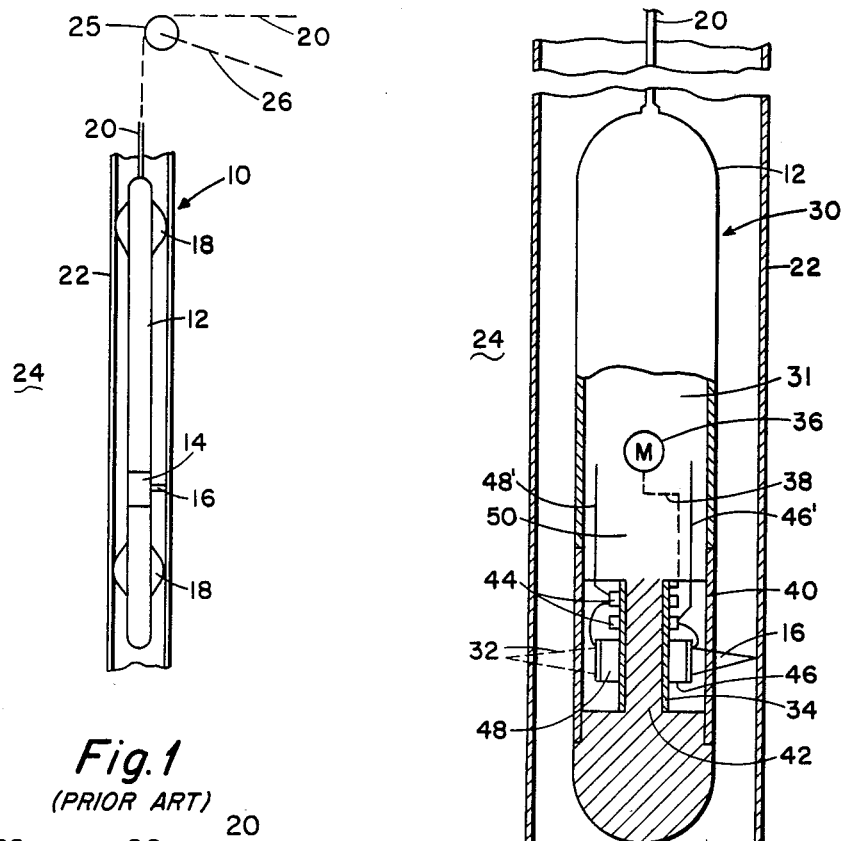
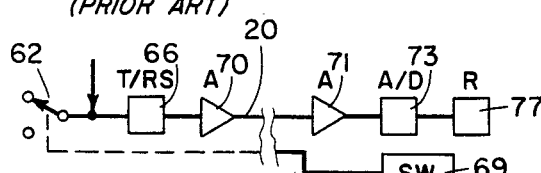
Fig. 3A
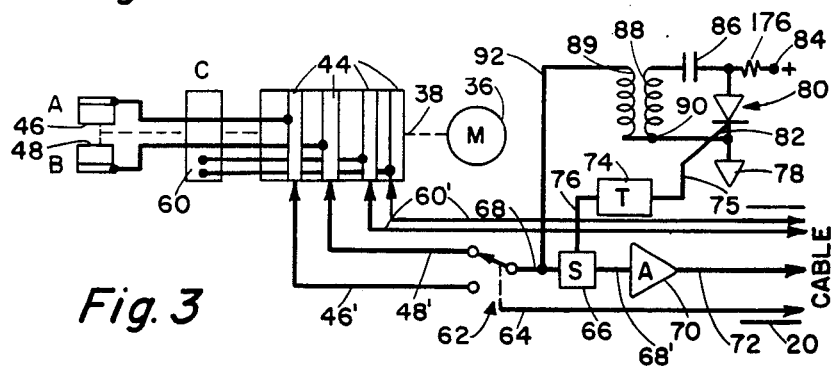
Fig. 3

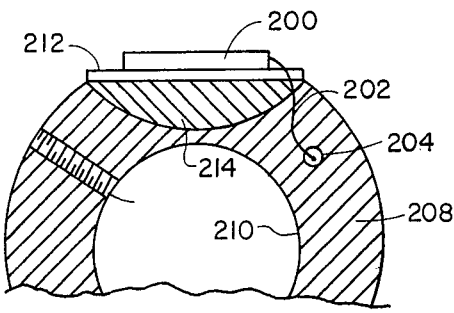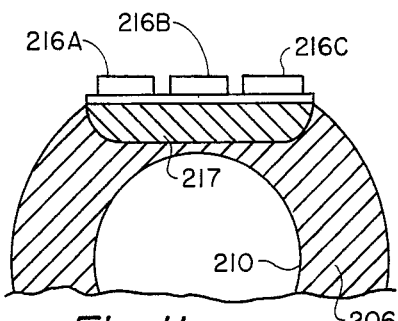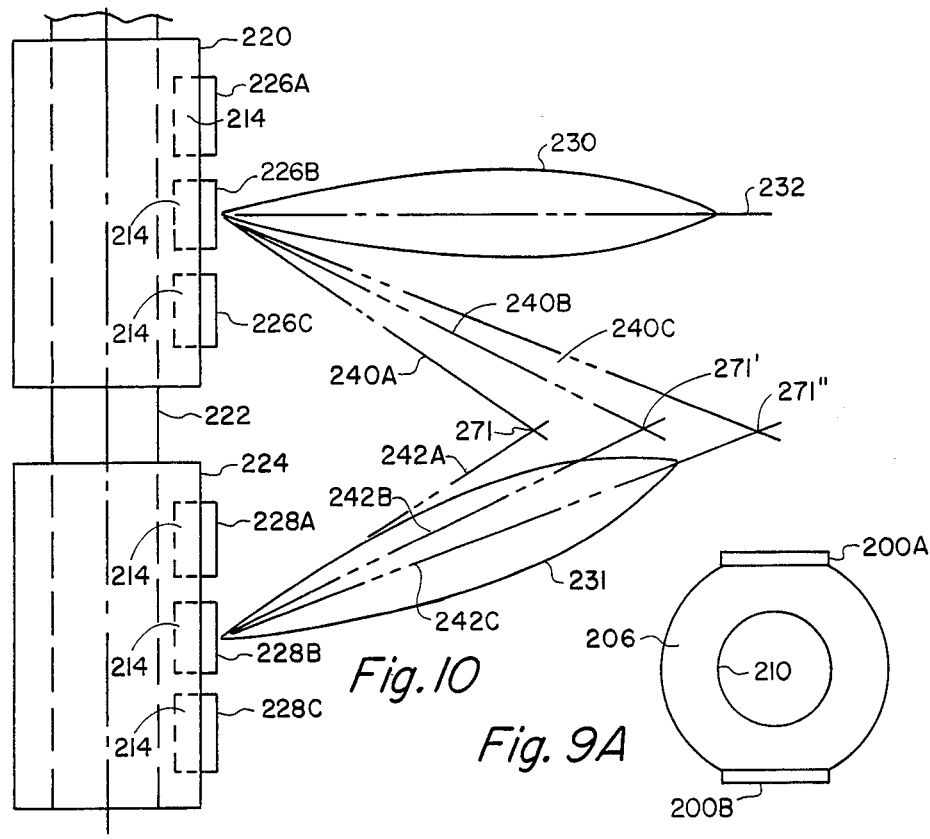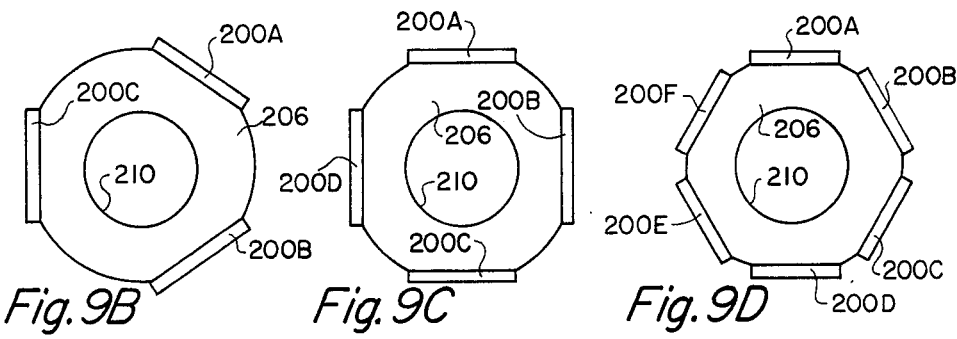

BOREHOLE TELEVIEWER SYSTEM USING MULTIPLE TRANSDUCER SUBSYSTEMS

BACKGROUND OF THE INVENTION

1. Field of the Invention

This invention lies in the field of acoustic logging systems for boreholes. More particularly, it is concerned with the logging of deep boreholes in the earth. Still more particularly, it concerns the use of an acoustical transducer which transmits a beam of high frequency acoustic energy into the borehole directed in a radial plane, and receives the returned reflected acoustical energy signal from a reflecting surface, such as the wall of the borehole, and transmits a processed electrical scan signal derived from such received signal, to the surface of the earth, through the cable which supports the instrument, or sonde, for further processing.

Still more particularly, it concerns improvments in such acoustic logging devices and in particular the use of two or more transducer systems on a single rotating assembly so that multiple probing signals are sent outwardly from the axis of the borehole and multiple reflected sonic signals are received, converted to electrical scan signals, which are then utilized in various ways.

2. Description of the Prior Art

This field of science and engineering is not new. It has been in useful operation in the logging of boreholes in the earth, such as oil and gas wells, for a number of years. There are various patents issued on selected features of these systems, and including the basic system, which form no part of this invention.

Examples of the prior art are illustrated by U.S. Pat. No. 3,369,626 entitled: "METHOD OF AND APPARATUS FOR PRODUCING A VISUAL RECORD OF PHYSICAL CONDITIONS OF MATERIALS TRAVERSED BY A BOREHOLE", issued Feb. 20, 1968 in the name of J. Zemanek, Jr. There is also U.S. Pat. No. 3,668,619 entitled: "THREE-DIMENSIONAL PRESENTATION OF BOREHOLE LOGGING DATA", patented June 6, 1972 in the name of Charles L. Dennis; U.S. Pat. No. 3,550,075 entitled: "SYSTEM FOR DISPLAYING TIME INFORMATION IN ACOUSTIC WELL LOGGING SYSTEM", issued Dec. 22, 1970 in the name of D. W. Hilchie et al; and U.S. Pat. No. 3,835,953 entitled: "ACOUSTIC CALIPER LOGGING", issued Sept. 17, 1974 in the name of Jerald C. Summers. There is also additional art recorded in the form of other patents, and in technical papers presented at technical society meetings, so that further description or statement of the art is not necessary at this time.

SUMMARY OF THE INVENTION

It is a primary object of this invention to provide a number of improvements in the design and construction of borehole logging instruments employing acoustical probing beams, and reflected sonic signals, and in the use of data from these instruments.

It is a further object of this invention to provide at least two or more transmitting receiver transducer systems (T/RTS) operating independently to provide multiple electrical scan signals, which are used cooperatively, in combination, to provide more information than would be possible by their separate use.

In the prior art, the rotating system, which is part of the logging instrument, or sonde, is lowered into the borehole in the earth by means of a long cable, unwound from a drum, and passing over a measuring wheel mounted at the mouth of the well, at the surface. Such cables comprise a multiple set of conductors, which can be used in various ways to transmit data from the sonde to the surface, and also to transmit power and/or control signals from the surface to the sonde. The main limitation of these instruments has been the use of only a single transmit/receive transducer system (T/RTS). Thus, in logging a hole it is necessary in advance to make a judgment as to which type of transducer, measuring a selected parameter, will be the most useful in a given subsurface situation.

In this invention the improvement lies in the use of two or more T/RTS. These are mounted on the same rotating assembly as the normal single T/RTS, in a known geometrical relationship to the first one. There may be two, three, four or more additional T/RTS and these may have the same electrical characteristics as the first one, or they may each be different from the other. By the use of different T/RTS, it is possible to probe into the earth to a deeper or shallower depth, depending upon the characteristic and the frequency of the T/RTS. For example, one of the problems of the conventional system is that is has a high frequency T/RTS, and high frequency sonic waves in the fluid in the well, such as drilling mud, suffer a high attenuation. Thus, the penetration of the sonic beam is limited by this attenuation, due to the fact that the sonic waves must travel a selected distance through the mud, or other fluid in the wellbore. By making the T/RTS of a lower frequency, the attenuation becomes less, and thus the sonic beam probes to a greater depth, or radial distance from the transducer into the rock wall.

With a plurality of similar transducers, arranged in a common plane transverse to the axis of the rotating assembly of the sonde, equally spaced circumferentially, a plurality of scans are made simutaneously, as the sonde is moved vertically at a selected constant rate. Thus, a shorter vertical spacing along the wall of the borehole is provided for each scan. This permits a much finer detail of scanning or probing. Conversely, it permits a higher rate of logging to get the same spacing of scan or probe traces.

The arrangement of multiple T/RTS can be in a horizontal plane circumferentially spaced, or in a vertical plane longitudinally spaced. This use of arrays of T/RTS will provide a stronger, better-focused scanning beam, of higher energy. Thus, the penetration of the beam can be greatly increased. These and other aspects of this invention will be described in detail in relation to the drawings.

BRIEF DESCRIPTION OF THE DRAWINGS

These and other objects and advantages of this invention and a better understanding of the priciples and details of the invention will be evident from the following description taken in conjunction with the appended drawings, in which:

FIG. 1 illustrates the prior art simply in the arrangement of the logging sonde held concentric with the wellbore by means of radial centering springs supportd by a cable which runs over a measuring wheel, the rotations of which are functions of depth.

FIG. 2 illustrates one embodiment of this invention employing two T/RTS arranged 180° apart in a horizontal plane on the rotating assembly.

FIG. 3 illustrates one method of utilizing the two T/RTS of FIG. 2.

FIG. 3A illustrates the surface apparatus that might be used in combination with the downhole apparatus of FIG. 3.

FIG. 4A illustrates the relative operation of higher frequency versus lower frequency T/RTS, while

FIG. 8 illustrates the main mechanical construction of a single T/RTS mounted on the rotating assembly in the sonde.

FIG. 9A, 9B, 9C, and 9D illustrate the possible arrangement of two, three, four, and six, T/RTS in a horizontal plane, equally spaced, circumferentially.

FIG. 10 illustrates a system in which multiple T/RTS are provided on the rotating system, but these are separated in a longitudinal direction in a common radial plane through the axis of rotation.

FIG. 11 illustrates the possibility of using multiple T/RTS in a linear array horizontally so that beam forming techniques may be used to provide a better focused and more penetrating beam than would be provided by a single T/RTS.

BRIEF DESCRIPTION OF THE PREFERRED EMBODIMENTS

Definitions

Figure 4A:
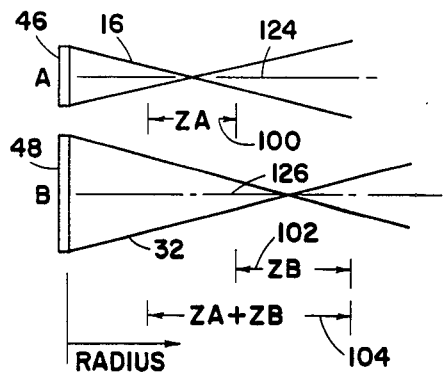

There are a number of words designating elements or parts of the invention that will be used frequently during the follwing description. I propose to define these in advance so that words may be saved in the description.

1. Sonde. This is the sealed logging instrument that contains the transducers, the controls, and power means for driving the transducers.

2. Rotating assembly or drum. This is the assembly on which the transducers are mounted, and which rotates about the axis of the sonde.

3. The transducers. These are the means to generate a sonic beam responsive to the application of a high frequency voltage or pulses to the transducer. In some instances the sonic generator can also be used as a sonic wave detector. In other instances one of a pair of transducers is used as a detector. These units will be called Transmit/Receive Transducer System or T/RTS.

4. While principal use of this sonde is in logging vertical boreholes in the earth, it can equally well be used in horizontal boreholes, etc. The proper word to use for indicating the position of two parts spaced along the axis is longitudinal, but the word vertical will be used when convenient. Also, a plane transverse to the axis of the sonde will be called transverse plane, or horizontal plane, and so on.

Description

Referring now to the drawings and in particular to FIG. 1, which is indicated as prior art, there is indicated generally by the numeral 10, a logging sonde 12 which is supported in a vertical borehole 22, by means of a cable 20 shown passing around a measuring wheel 25 at the surface. The rotations of the wheel 25 measure the length of cable that has passed over the wheel. The rotations of the wheel 25 are transmitted by means 26 through an appropriate drive system, to control the movement in the direction representing verticality, in any display system that might be used.

The sonde 12 is supported by radial centering springs 18 so that the axis of the sonde is coaxial with the borehole 22. A section of the sonde indicated by numeral 14 rotates by motor means in the sonde, at a selected constant rate. A probing beam of sonic energy 16 passes out radially from the rotating portion 14 to probe the wall and provide information regarding the character and the parameters of the wall 22, and the material of which the wall is composd. This wall might be a steel casing surrounded by cement in a drilled borehole in a rock formation or it might be an open borehole.

Referring now to FIG. 2, there is shown, to a larger scale, a view of parts of a sonde, improved according to the teaching of this invention. Very little information will be provided regarding the normal electronic circuits in the space 31. These are fully described in many configurations in the patent literature referred to earlier. Wherever the circuitry would be different in this invention it is, of course fully described as will be clearly seen in the figures.

The sonde 30 comprises an outer shell 12 of conventional construction. In the lower portion a cylindrical bulkhead 50 is fastened rigidly and sealed to the outer shell and a downwardly extending axial post 42. Bearings (not shown) are provided on the post 42, so that a cylindrical tube or sleeve 34 can be rotated about the post 42 by means shown as the dashed line 38, controlled by motor 36. Such a rotating sleeve, as indicated, is common to the prior art design.

On the sleeve 34 is mounted a first T/RTS 46 with its outer face tangential to the surface of revolution, as the sleeve 34 rotates. This T/RTS 46 is periodically excited by electrical circuits which will be described, and transmits radially outwardly a sonic beam indicated by the numeral 16, which passes to the wall 22 of the borehole, which may be cased or uncased. Part of the sonic energy is reflected backwardly to the T/RTS. The conducting outer surface of the T/RTS is connected to a slip ring 44. A brush or electrical contact, stationary in the sonde, contacts the slips ring as the sleeve rotates and transmits on the lead 46' the electrical scan signal relfected from the wall of the borehole.

In the normal design of a borehole acoustic logger, or borehole televiewer (BHTV), only one such T/RTS 46 is provided, and the signal is collected from the slip ring 44 by the brush and passes by conductor 46' to circuits in the electronic package 31, which are conventional. The processed signal then passes up through a transmission channel in the cable 20, which is normally a pair of conductors, or a coaxial cable, to the surface, where it is utilized.

In this invention, at least a second T/RTS is mounted on the rotating assembly comprising the sleeve 34, etc. It is energized in a manner similar to that of the T/RTS 46 and produces a scan signal which goes by means of the lead 48' to the electronic package in space 31 and to the surface in a manner similar to that of 46'. As will be discussed in greater detail in connection with FIGS. 8, 9A, 9B, 9C, 9D, 10 and 11, various combinations of multiple T/RTS arranged in a common horizontal plane, equally spaced circumferentially, can be provided which will provide certain benefits. Also the multiple T/RTS can be provided in a longitudinal array, whereby other benefits can be realized, or in some combination of circumferential and longitudinal arrays.

One possible electronic circuit that might be used with the apparatus of FIG. 2 is illustrated in FIG. 3. Here the two T/RTS 46 and 48, labeled A and B respectively, are rotated by the means 38, as previously described, by the motor 36. The rotating slip rings are shown as 44, four of them are shown, two of them are connected internally to the T/RTS 48 and 46 respectively, and two slip rings are connected to a compass unit 60, which is well known and provides a member which remains in a fixed azimuth as the sonde moves vertically in the hole. On each rotation of the rotating assembly 34, an electrical pulse signal is provided as a selected point on the rotating assembly passes the constant azimuth angle of the compass. This can be a magnetic compass, which might be useful in logging an open hole, or a gyro compass, or its equivalent, as would be well known in the art. By means of the signal received from 60 that passes internally to the slip ring, and by the collector to line 60', the orientation of the sonde with respect to an absolute azimuth such as north, can be determined. Thus, it can be represented on north/south or east/west displays, etc. Use of a compass is well known in the prior art The manner in which the T/RTS are used to probe the wall of the borehole is illustrated in FIG. 3 for completeness as to the electrical circuits in the upper righthand portion of the FIG. 3. A power supply at 84 supplies power by resistor 176 to capacitor 86, and passes through the primary 88 of a transformer, to junction 90 and ground 78, which is connected to the negative potential of the power supply. A triggered rectifier, or gate control rectifier, 80 is connected between the potential at the junction of resistor 176 and capacitor 86 to the ground 78.

There is a timing means 74 which is conventional, operated by a clock of constant frequency, and including a counter means, such that at a selected time a signal pulse can be placed on line 75 to the trigger connection 82 of the controlled rectifier 80. When the trigger pulse arrives, the capacitor having been previously charged to the full potential of 84, now discharges through the rectifier 80 to the ground and this large current passing through the primary 88 of the transformer generates a corresponding voltage in the secondary 89 of the transformer, which goes by line 92 to the line 68, which can be connected to one or the other of the two T/RTS 46 or 48, as selected by the switch 62.

The switch 62 can be as simple as a relay, which is controlled by a potential on line 64; that is, controlled by means of a signal from the surface through one of the multiple conductors of the cable 20, as is well known in the art. Consider that the pulse of high voltage is delivered by line 92 to the line 48', which means it is delivered to the T/RTS 48 and the transmitter puts out a pulse of sonic energy of selected amplitude and frequency. This propagates outward radially through the mud in the annulus of the borehole (or liquid of selected composition), to an obstruction such as the surface of the casing. Here part of the sonic energy is reflected and passes backward over the same path to the T/RTS 48, where it generates a corresponding received signal, or electrical scan signal, which comes back from the T/RTS 48 through line 48', through the switch 62, to the box 66 which is marked S. Box 66 is a switch of a particular nature which is used for cutting off the receiving amplifier 70 from the line 68 during the period that the high voltage is on the line 92 to generate the transmitted sonic pulse. Thus at a selected short time delay after that pulse is sent from line 92 to 48 and transmitted into the liquid, the connection from line 68 through the switch 66 and line 68' to the amplifier 70 is now connected, and the amplified reflected signal is passed by line 72 which is a high frequency transmission channel, for transmitting the scan signals through the cable to the surface. The timer 74 applied, through 76, the necessary gating potential to the switch 66. This can be as simple as an AND gate which is open during the time that the potential is applied to 92, and is closed shortly after that potential disappears.

Figure 7:
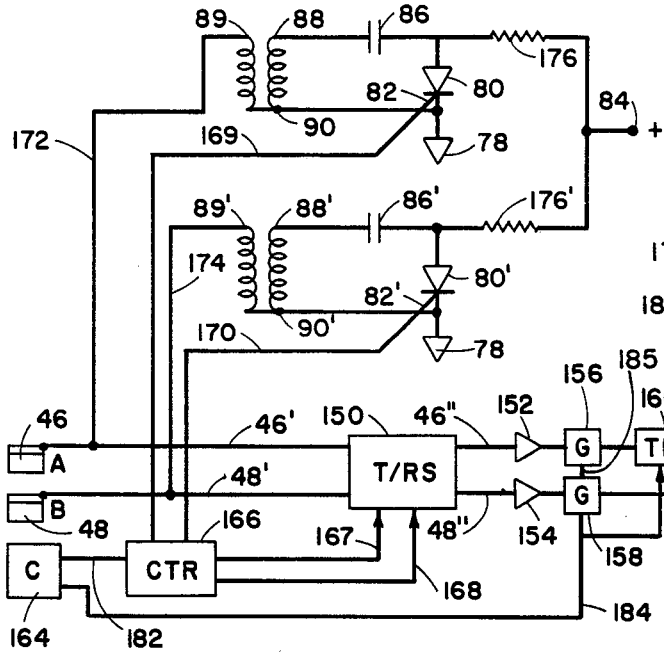
FIGS. 7 and 7A illustrate two variations of a system employing two separate T/RTS.

As will be shown in FIG. 7, as many parallel transmitted signals as desired can be used, by multiplying the network of the grid controlled rectifier 80 and transformer 90. FIG. 7 illustrates a case of two separate T/RTS being powered simultaneously, and of course, any number greater than two can likewise be powered by adding on circuits similar to the two shown.

The particular usefulness of the system of FIG. 3 will be evident if the two T/RTS 46 and 48 are of different frequencies. If the transducers are of different frequencies, the beams of higher frequency have a shorter depth of penetration through media, such as the mud in the borehole. Lower frequency sonic beams are less attenuated and have a greater distance of penetration. Therefore, if it is desired to probe simply the inner wall of the casing or the all of the borehole, then a high frequency T/RTS would be used.

There is a factor called "aperture" which is a function of the ratio of diameter of the transducer to the wavelength of the sonic signal. The higher the frequency, the shorter the wavelength, and the larger the aperture for a given diameter transducer. The larger the aperture, the sharper the beam width and the better the "focusing" of the sonic energy.

A high frequency transducer has better beam forming, but unfortunately, has a shorter penetration. Therefore, for short distances of probing, a high frequency transducer would be used. On the other hand, where it is desired to probe well beyond the wall of the borehole, a pulse of sonic energy of a lower frequency that would be less attenuated in its passage through the mud and the material surrounding the borehole would be used. On the other hand, a lower frequency transducer of the same diameter would have a smaller aperture and will not be focused as sharply. Also, the beam focus or image detail will not be as good as it would be for a higher frequency transducer.

In FIG. 3A a portion of the circuit of FIG. 3 showing the switch 62, the transmit/receive switch 66, amplifier 70, and cable 20, are connected at the surface to an amplifier 71 and to an analog-to-digital converter 73, and to a recorder 77. More will be said about the surface portion of the system later. However, FIG. 3A provides an indication of how the scan signals provided by the two T/RTS 46, 48, can be successively transmitted by switching the relay 62 by means of the transducer select switch 69.

Referring now to FIG. 4A and considering the system of FIG. 3 with two I/RTS 46 and 48, consider the T/RTS 46 as high frequency, provding a beam 16 as indicated in FIG. 1 and the T/RTS 48 being of lower frequency, and having a beam 32 as in FIG. 2.

Figure 4B:
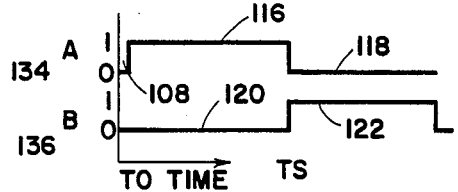
FIG. 4B illustrates the gating operation of the two T/RTS shown in FIG. 4A.

The sonic energy delivered to the surrounding liquid by a T/RTS has an optimum zone ZA-100 for the high frequency T/RTS, and a different zone ZB-102 for the lower frequency T/RTS 48. In general, the range, or radius from the T/RTS to the optimum position in the zone A of useful scanning 100, will be shorter for the higher frequency T/RTS, than the zone B-102 for the lower frequency T/RTS. If 46 is a high frequency T/RTS, and 48 is a corresponding low frequency T/RTS, and if the zones A-100 and B-102 are not mutually overlapping, it is then possible to use the high frequency T/RTS during the time that the pulse of energy traverses the near zone A-100, and use the lower frequency T/RTS 48 during the time that the pulse beam traverses the distant zone B-102. The way to do this is illustrated in FIGS. 4B and 5.

Figure 5:
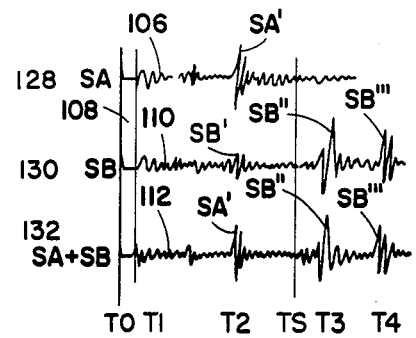
FIG. 5 illustrates the received signal from the two transducers of FIG. 4A.

Referring now to FIG. 5, in line 128 there is a trace called SA, or scan signal of transducer A. Consider that the high voltage pulse along line 92 (of FIG. 3) occurs at the time T0 and a sonic pulse is sent out from the transducer A. For a short time interval 108, to time T1, no received signal is passed to the receiving amplifier 70. Then a reflected transmission 106 passes through the fluid in the borehole to the transducer, and at a selected time T2 later, a reflection comes back from the borehole wall, identified as SA'. After a time TS the energy of the sonic beam is insufficient to provide a satisfactory received signal.

If the low frequency transducer is pulsed at T0 plus one-half revolution and occupies the same position as the high frequency transducer had, the trace will be like SB in line 130, and trace 110 will be the scan signal provided by the low frequency transducer. Of course, at a time about T2 there will be some reflection SB', probably of lower amplitude and broader time duration than the reflection SA' of the high frequency transducer. Thereafter, there will still be sufficient energy to traverse part of the rock behind the wall of the borehole where there may be a reflecting surface, such as the bottom of a hole or vug, and a signal SB" is provided. There may even be other reflected signals such as the one indicated by SB'''.

It will be clear from examining the traces 106 and 110 that in the region of the reflection SA' that the high frequency transducer whose record is 106 provides a much improved record in the near field than the lower frequency transducer 110 does. Consequently, it is desirable to prevent the recording and display of the portion of 110 up to the time TS, and during that period, the gating pulse 116 of FIG. 4B causes the high frequency signal from transducer A to be present, such as trace 112. At the time TS, the gating pulse 102 passes the signal from the second transducer B to provide the remainder of trace 112 at times T3 and T4.

By this means, it will be clear that by making use of two T/RTS of different frequencies and by proper delay of one electrical scan signal with respect to the other electrical scan signal, and gating the two scan signals appropriately, as has been described, a combination of the two scan signals provides a much improved record in the near field, and having a greater depth of penetration in the far field, than would be provided by either one alone.

Figure 6:
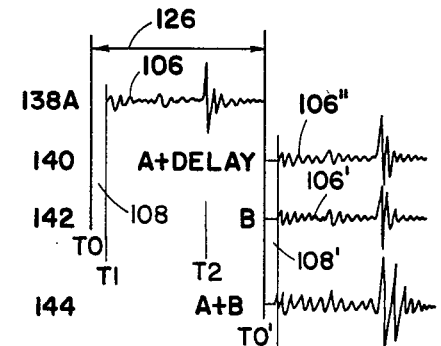
FIG. 6 illustrates the use of time delay between the two T/RTS of FIG. 3 combined with the gating system of FIG. 4B.

In FIG. 6 is illustrated the case where the plurality of T/RTS are all of the same frequency, and the cable can transmit only a single electrical scan signal at any one time. One way of handling the plural signals is to delay on with respect to the other and sum the two, to provide a signal of improved signal-to-noise ratio. FIG. 6 shows the original scan signal of T/RTSA on line 138A which would be identical to the trace 106 of FIG. 5. Trace 142 shows the same trace 106' provided by the second transducer B, which, of course, is delayed by 180° of rotation of the rotating system. If trace 106 on line 138A is delayed by the time period 126, or one-half revolution, it appears as 106" on line 140, which would be identical to, and in-phase with, the trace 106' produced by the T/RTS beam B. By summing those two signals 106" and 106', the results are shown on line 144 as a trace of A+B, of improved amplitude and signal-to-noise ratio. Thus, the event on trace 106 which occurs at time T2 will now be much more pronounced on line 144, at the time T2'.

Instead of delaying one trace with respect to the other when the two T/RTS are of the same frequency and summing and trasmitting the sum signal to the surface, it would be much more desirable to be able to transmit the two signals separately, and cotemporaneously, to the surface. This could be done, for example, if there were two transmission channels instead of the cable 20, or if there was a multiplex system by means of which a plurality of N signals could be sampled at a high rate of sampling, and the successive samples from each of the separate signals would be transmitted in sequence to the surface. There they would be demultiplexed by means which are well known in the art.

Refer now to FIG. 7 which has been previously mentioned in conjunction with FIGS. 3 and 4. There is shown the situation in which there are two T/RTS as in FIG. 3, numbers 46 and 48 respectively. Each of the two T/RTS have a transmit signal applied through leads 172 and 174 respectively, to leads 46' and 48' to the T/RTS A and B. The timing for these transmit signals is provided by a counter 166 which has a clock signal over lead 182 from a constant frequency clock or oscillator 164. By prearrangement, the counter counts up to selected numbers, which indicate selected timing; and the two trigger rectifiers 80 of the transmission source assemblies, which have previously been described in detail in relation to FIG. 3, are then controlled by the leads 169 and 170 from the counter or timer 166, to the control gate 82 and 82' respectively.

The counter 166 also provides gating pulses or timing pulses on leads 167 and 168 to the transmit/receive switch 150. This disables the detecting apparatus following the switch 150 while there is the high potential signal applied to the T/RTS from the transmission electronics over leads 172 and 174. However, after the short interval 108 of FIG. 5 after the transmission pulse is sent, the T/RS 150 will then enable the electronics following through leads 46" and 48" to amplifiers 152 and 154, and through gating means 156 as described in relation to FIG. 4B.

The timing for this gating is derived from the clock 164 over lead 184. The time delay unit 160 which follows the gating controls 156, 158 is controlled by the counter over lead 184, 185. The gating units 156, 158 and the delay unit 160 carry out the operations described in connection with FIG. 5. Following these three units the two signals are added together by means of a pair of resistors 162 being applied together to the input to an amplifier 180, the output of which goes to the transmission channel 178 in the cable 20. Thus, by means of this apparatus so far described in FIG. 7, the action would be to create the sum trace shown on line 132 of FIG. 5 and transmit the trace to the surface, for recording and display.

As mentioned previously and shown in FIG. 7A, the case where there are two transmission channels in the cable 20, such as 186 and 188 of FIG. 7A, it is then possible to come from a T/RS switch 150 directly to amplifiers 152 and 154 and apply the amplified signals, one to each of the two transmission channels.

Figure 7A:
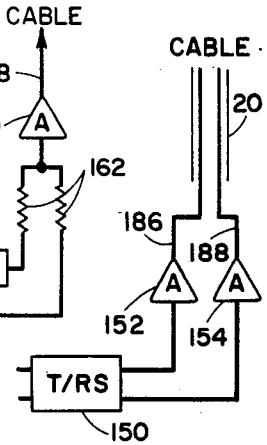
Figure 12C:
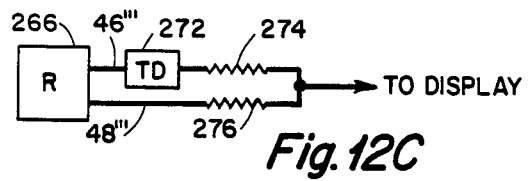
FIGS. 12A, 12B, and 12C represent various methods of transmission and utilization of the scan signal from multiple T/RTS.
Figure 12B:
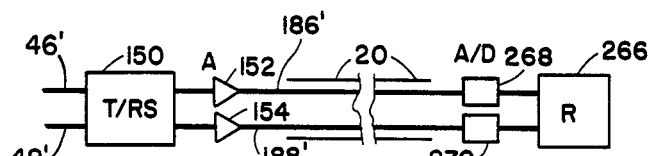

The situation illustrated in FIG. 7A is exemplified a little more completely in FIG. 12B to which reference is now made. Here, the lines 46' and 48' carrying the reflected scan signals from the T/RTS 46 and 48, go to the T/RS switch 150, then to amplifiers 152 and 154. The amplified signals then go to the two separate channels of transmission through the cable; namely, 186 and 188. The surface end of the cable 20 is similarly shown and the conductors now 186' and 188' go to analog-to-digital converters 268 and 270. The digitized signals then go to a digital recorder 266 in a conventional manner. While two separate analog-to-digital converters are shown, they could, of course, be combined into a single instrument, as is well known in the art.

Figure 12A:
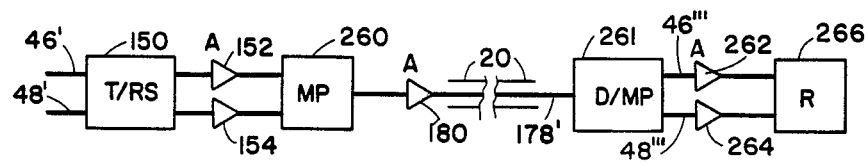

In FIG. 12A is shown an alternative circuit, in which the signals from the T/RS switch 150 area amplified in amplifiers 152, 154 and then go to a multiplexing means 260, the output of which on a single line goes to amplifier 180 and to a single transmission channel 178 in the cable 20 to the surface. At the upper end of the transmission channel 178' connects to a demultiplexing unit 261, which converts the combination signal on line 178' back to the two component signals, which were amplified by the amplifiers 152 and 154. These two component signals 46''' and 48''' on the output of 261 go to amplifiers 262 and 264 and then to a conventional digital recorder 266 for later playback and display.

FIG. 12C illustrates how a playback of the recorder 266 can provide the two original signals 46''' and 48''', so that as in the case of FIG. 7 these two signals can be combined after one of them is delayed in the timed delay unit 272 and combined in the combination of resistors 274 and 276 to the single trace which goes to the display device.

Therefore, the combination of FIGS. 7, 7A, and 12A, 12B, and 12C provide symbolically three separate methods of transmission of the signals from multiple T/RTS from the subsurface sonde to the surface, to be recorded and/or displayed. While it is possible to have any one of many different displays, which do not form a part of this invention, the most common display means can only represent a single scan signal at a given time. It is convenient, therefore, either to combine two or more signals as has been described in FIG. 7. Of course, more than two separate T/RTS scan signals can be summed to provide a single sum signal to transmit to the surface.

Another way of transmitting multiple scan signals to the surface is to have a separate transmission channel for two or more separate scan signals so that they can be transmitted separately and simultaneously to the surface over independent transmission channels as in FIGS. 7A and 12B.

The third method has just been described as the one in which a plurality of simultaneously recorded signals can be transmitted over a single transmission circuit to the surface by the process of multiplexing. Devices for doing multiplexing are commercially available and need not be further described.

In general, it is very desirable to separate out at the surface each of the separate electrical scan signals so that they could be recorded as a function of time, or as a function of depth of the sonde below the surface in separate recording channels. The best way of doing this is to record them on separate channels of a multiple channel analog recorder, such as are available in the art, or to digitize each of the separate signals and to record them separately on separate recording channels of a digital magnetic recorder. Another way would be to store the digitized separate signals into one or more separate digital memories, particularly random access memories, such as are now available on the market.

So far in this description of the broad aspects of my invention, I have described the use of multiple T/RTS arranged on the rotating assembly in a horizontal plane. And, as has been described, there are a number of particular advantages to the use of the multiple T/RTS arranged at various azimuths on the rotating assembly.

There is one important advantage of multiple similar T/RTS scanning the circular path at slightly delayed time intervals, one after the other. If these multiple signals can be brought to the surface separately, then it is possible to record them and then to play out each of the separate traces sequentially. In view of the continuous vertical motion of the sonde, each of these T/RTS scans a horizontal scan trace on the wall of the borehole which is theoretically indepenedent of each of the others. For example, if there were two similar T/RTS, one spaced 180° behind the other, it would be possible either to show a finer detail of scanning display along the borehole, or to permit the sonde to be moved vertically twice as rapdily, and still have the same conditions of trace spacing in vertical dimension, as would be obtained at half of the vertical velocity of the sonde with a single T/RTS system, as at present.

One reason for the high cost of logging is because of the time it takes to make a log. The longer it takes, the longer is the commercial use of the well delayed, the longer the logging equipment is utilized, and the greater the cost of the logs. Thus, speeding up the vertical rate of travel of the sonde could materially reduce the cost of logs, without providing any reduced utility or value of the resulting records. It is quite possible that as many as four or more T/DTS could be used to obtain a logging speed four times, or more, the present speed of logging with a single T/RTS.

It is also important to use multiple T/RTS in a vertical array that is arranged in a plurality of different horizontal planes on the rotating assembly. Such multiple T/RTS would be preferably aligned in a vertical plane through the axis of rotation although this is not required.

For a description of the manner in which the multiple T/RTS can be built into the instrument, reference is made to FIG. 8 which shows the present method of mounting a single T/RTS 200 on the rotating assembly 206. The rotating assembly has an internal surface 210 which is adapted to fit snugly the outside of the rotating sleeve 34 illustrated in FIG. 2. Thus a plurality of T/RTS could be mounted vertically on a suitable cylinder such as of 206 of sufficient longitudinal dimension as shown in FIG. 2. Some means such as a set screw or other suitable means 208 would be provided to hold and anchor these rings or cylinders 206 to the rotating sleeve 304 to maintain a rigid rotating assembly. A thin metal sheet 212, preferably made of non-magnetic material, has a central opening which is slightly larger than the diameter of the T/RTS 200. The T/RTS is a thin slab of a cylinder of suitable material which is piezoelectric or electrostrictive. The slab 200 is anchored to the thin sheet 212 by positioning it in the center of the opening and locking the two together by suitable resilient adhesive means, which will anchor the slab but maintain a resilient adhesive means, which will anchor the slab but maintain a resilient type of mounting. Thus, no interference is offered to the proper vibration of the transducer. as electrical signals are applied to the electrodes on the top and bottom surfaces.

A volume of backing material indicated as 214 is formed in a suitable shape. The front surface attaches to the sheet 212. This backing material is made of a mixture of a very fine powder of a very dense metal, such as tungsten mixed and sealed into a resilient plastic material. The backing serves to absorb the vibrations transmitted by the back side of the T/RTS; that is, the surface of the slab which faces the flat surface of the backing material.

Both surfaces of the piezoelectric slab vibrate in opposition to each other; and unless one of these is greatly attenuated, the two will partially cancel each other. Thus, there will be only a very small part of the energy transmitted perpendicular to the top surface of the slab, or T/RTS 200. The type of backing material which has just been described is conventionally used in the art and forms no part of this invention and need not be described further at this time.

The lead 202 connected to the top surface of the T/RTS 200 goes through a drilled opening 204 as is indicated schematically in FIG. 3. Other openings will also be present for the passage of additional signal leads, like 202 from other T/RTS mounted on the sleeve 34. With this description of the conventional method of mounting and building the rotating assembly, etc., no further description will be made, except to indicate how additional separate transducer slabs, such as 200, can be utilized.

FIGS. 9A, 9B, 9C, and 9D indicate possible combinations of two or more T/RTS. For instance, in FIG. 9A two slabs 200A and 200B are shown mounted upon a single ring 260 at 180° azimuth from each other. In FIG. 9B three T/RTS 200A, 200B, and 200C are positioned at 120° azimuth from each other. Similarly, in FIG. 9C the spacing is 90° and in FIG. 9D the spacing is 60°. Other spacing arrangements or construction details can be provided, of course, and those shown in FIGS. 8, 9, 10, 11, and 12 are just by way of illustration, and not by way of limitation In FIG. 10 is shown an embodiment which utilizes a plurality of T/RTS units 226A, 226B, and 226C arranged on a selected rotating assembly 220, each unit having its own backing material 214 and arrayed along a longitudinal plane through the axis of rotation. One of the important things that can be done with an array of this sort is to provide, at least in the vertical dimension, a greater dimension of transducer. A larger diameter transducer, of course, provides a much better collimated beam, which is of real value in providing greater detail of th reflecting surface which it is designed to probe.

There has been a great deal of theoretical and engineering work done on the transmission of signals from various types of linear arrays of transmitters. The same logic that has been developed can apply to high frequency radar antennas, or to sonar antennas, or seismic antennas, both transmitting and receiving. These arrays, while important in transmitting a more suitable beam of energy, also provide a greater receiving sensitivity than a single small transducer, as is normally used.

In FIGS. 10 an axis 232 is shown, in a diametral plane, of the rotating assembly 220. The oval contour 230 indicates the shape of the beam in relation to its diameter, as a function of the distance, or radius, away from the transmitter along the axis 232. This shape 230 can be improved by simultaneously energizing the separate transducers in accordance with the theory. This theory has been developed over the years and is well known and is fully described in the literature. See, for example, Albers, *Underwater Acoustics Handbook II,* pp. 180–205. The type of beam form shown in FIG. 10 is indicated as the possible improved type of transmitted beam and receiving sensitivity when the proper theory is used and the individual beam elements 226A, 226B, and 226C are supplied with transmitting signals in proper phase and amplitude relation. Since the electronics of beam forming is well known, no further description of a beam forming circuit is necessary.

Another capability of a linear antenna, such as shown in the upper part of FIG. 10, is that by proper phase and amplitude control of the electrical signal applied to the transducers, the main axis of the beam which is shown as 232, for example, can be tilted, so that the axis could be along the lines 240A, or 240B, or 240C, etc., for example.

It is possible to use a second similar assembly 224 having a plurality of say three T/RTS, numbers 228A, 228B, and 228C, etc. The beam 231 could likewise be tilted at angles 242A, 242B, or 242C, for example, similar to the angles of 240A, 240B, 240C. It is clear, therefore, if one of these assemblies is used as a transmitter and transmits along the direction 240C and the other unit 224 acts as a receiver and directs its receiving beam along the line or axis 242C, then at a surface such as 271, there will be a reflection of the trasmitted energy. The beam on axis 242C will be reflected back along axis 242C to the array of the unit 224. Also, by changing the angles or tilt of the beams 230 and 231, the optimum point of reflectivity can be changed from 271 to 271' or 271", for example, and so on. The manner in which the tilt of the beam can be changed is something that can be controlled by means of the amplitude or frequency of a voltage or current supplied to the circuit that does the beam forming, and of course, this control can be provided from the surface through a control conductor in the cables to the sonde. Thus, if the received signal as indicated by the beam 231 can be transmitted to the surface, and viewed on a display, the beam tilting circuits can be varied to change the radius over a wide range for careful exploration of the material behind the wall of the borehole.

Of course, as has been described earlier, to get deeper penetration of the beam, it is preferred to use as low a frequency of oscillation of the transducer as possible without endangering the precision and detail of the measurement.

Also, where the liquid medium in the wellbore can be changed during the period of time the logging is done, it may be wise to provide a suitable liquid medium that offers the lowest attenuation to the sonic signals utilized in the scanning process.

Figure 13:
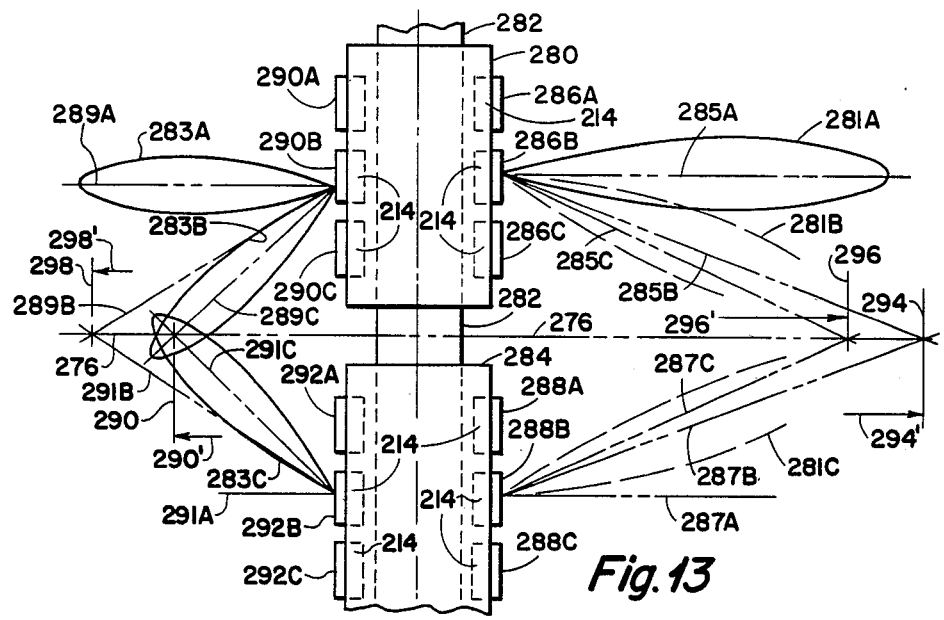
FIG. 13 illustrates a variation of FIG. 10.

Referring now to FIG. 13, there is shown a T/RTS system which is a further extension of FIG. 10, and includes a plurality of T/RTS in both a horizontal plane and a vertical plane. Thus, assemblies 280, 284 compare to 220 and 224 of FIG. 10, but differ in that there are two sets of vertically spaced T/RTS. Assembly 280 includes also an array 290A, 290B, 290C, and a vertically spaced array 292A, 292B, and 292C. As in FIG. 10, array 286 cooperates with array 288 to provide one transducer 286 for transmission and one transducer for reception, for example. These are preferably multi-element so that beam forming and tilting can be provided.

Similarly, arrays 290 and 292 cooperate with each other in the same way. However, one of the advantages of FIG. 13 is that arrays 286, 288 can be lower frequency, and arrays 290 and 292 can be higher frequency. This is shown in FIG. 13 by the indicated axes of the two T/RTS systems. Thus the effective radius of detection of 286, 288 is 294 at radius 294', whereas the radius of detection of 290, 292 is 298, at radius 298', which is considerably shorter than 294'. Of course, both sets of beams would be remotely controllable to different axes and different effective radii.

FIG. 11 illustrates the use of multiple transducers in a horizontal plane, which can provide beam forming, in a way similar to the arrays of FIGS. 10 and 13.

What has been described is basically a system of multiple T/RTS in a sonic borehole scanner or borehole televiewer, which has a plurality of transducer assemblies by means of which the combination of scan signals from the plurality of T/RTS can provide information of greater value, more effectively, and more efficiently, than can be done with a single T/RTS.

The multiple T/RTS can, of course, be arranged with respect to each other in azimuthal array in a horizontal plane, or in a vertical array in a vertical plane, or in combinations of multiple horizontal planes and/or multiple vertical planes as has been fully described.

When the words "high frequency" and "low frequency" are used to characterize the properties of the transducers, they mean transducers that have natural oscillation frequencies in the ranges of about 0.5 to about 1.5 MHZ, and from about 75 to about 750 KHZ, respectively.

This invention makes possible three-dimensional imagery of the rock response surrounding the borehole. This concept is considered useful in application to any logging parameter that can be focused and beam steered.

While the invention has been described with a certain degree of particularity, it is manifest that many changes may be made in the details of construction and the arrangement of components without departing from the spirit and scope of this disclosure. It is undersood that the invention is not limited to the exemplified embodiments set forth herein but is to be limited only by the scope of the attached claim or claims, including the full range of equivalency to which each element thereof is entitled.

What is claimed is:
1. A Method of logging a borehole in the earth comprising:
    (a) generating a first acoustic signal having the frequency F1 at a depth in the borehole;
    (b) generating a second acoustic signal having the frequency F2 which is less than F1 in the borehole at approximately the depth;
    (c) generating a first electrical scan signal representative of a response to the first acoustic signal;
    (d) generating a second electrical scan signal representative of a response to the second acoustic signal;
    (e) discarding all of the first electrical scan signal except a first portion,
    (f) discarding a first portion of the second electrical scan signal and retaining a second portion,
    (g) adding the first portion of the electrical scan signal and the second portion of the second electrical scan signal and obtaining a composite signal.
2. The Method of claim 1 wherein:
the first signal is selectably generated along a selected path encircling the wall of the borehole and the second signal is selectably generated along approximately the same path.
3. The Method of claim 3 wherein:
the paths encircling the wall of the borehole are spiral.
4. The Method of claim 2 wherein:
the paths cover a selected vertical interval of the borehole.
5. The Method of claim 1 wherein;
the first acoustic signal and the second acoustic signal are directed along approximately the same path.
6. A Method of logging a borehole comprising:
    (a) generating a first beam of acoustic energy in the borehole having a frequency F1 and directed along a path in a borehole;
    (b) receiving reflected responses from the first beam of acoustic energy and obtaining a first reflected signal and producing a first electrical scan signal;
    (c) generating at least a second beam of acoustic energy in the borehole having a frequency F2, which is different from F1, and directed along essentially the path; and
    (d) receiving reflected responses from the at least a second beam of acoustic energy and obtaining at least a second reflected signal and producing at least a second electrical scan signal; and
    (e) combining the first electrical scan signal and the second electrical scan signal and producing a combined signal having a greater depth of penetration than that resulting form second frequency F2 alone and having an improved record in the near field from that produced by first frequency F1 alone.

* * * * *